United States Patent
Nix

(10) Patent No.: US 9,596,493 B2
(45) Date of Patent: Mar. 14, 2017

(54) MULTI-STREAM CONTAINER INFORMATION COMMUNICATION BETWEEN INFORMATION HANDLING SYSTEMS

(75) Inventor: William Dale Todd Nix, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 947 days.

(21) Appl. No.: 13/361,399

(22) Filed: Jan. 30, 2012

(65) Prior Publication Data

US 2013/0198337 A1    Aug. 1, 2013

(51) Int. Cl.
| | |
|---|---|
| G06F 15/16 | (2006.01) |
| H04N 21/2343 | (2011.01) |
| H04N 21/258 | (2011.01) |
| H04N 21/854 | (2011.01) |
| H04N 21/262 | (2011.01) |

(52) U.S. Cl.
CPC ........ *H04N 21/234363* (2013.01); *H04N 21/23439* (2013.01); *H04N 21/25825* (2013.01); *H04N 21/85406* (2013.01); *H04N 21/26258* (2013.01)

(58) Field of Classification Search
CPC ..... H04N 21/234363; H04N 21/23439; H04N 21/85406; H04N 21/25825; H04N 21/26258
USPC ................................................. 709/219, 231
See application file for complete search history.

(56) References Cited

U.S. PATENT DOCUMENTS

| | | | |
|---|---|---|---|
| 6,407,680 B1* | 6/2002 | Lai et al. .................. | 341/50 |
| 6,593,860 B2* | 7/2003 | Lai et al. .................. | 341/50 |
| 7,054,911 B1* | 5/2006 | Lango et al. ............. | 709/213 |
| 8,219,711 B2* | 7/2012 | Visharam et al. ........ | 709/246 |
| 2008/0195761 A1 | 8/2008 | Jabri et al. | |
| 2009/0088191 A1 | 4/2009 | Norton et al. | |
| 2009/0282077 A1 | 11/2009 | Thomas | |
| 2011/0173345 A1 | 7/2011 | Knox et al. | |
| 2012/0170906 A1* | 7/2012 | Soroushian et al. ...... | 386/241 |
| 2013/0061045 A1* | 3/2013 | Kiefer et al. ............. | 713/160 |

* cited by examiner

*Primary Examiner* — Philip Chea
*Assistant Examiner* — Robert B McAdams
(74) *Attorney, Agent, or Firm* — Terrile, Cannatti, Chambers & Holland, LLP; Robert W. Holland

(57) ABSTRACT

A multimedia content container storing multimedia content in plural formats has a portion of the multimedia content transmuxed in a selected one of the plural formats to a delivery container for communication from a server information handling system to a client information handling system in response to a request for the content. Only the format supported by the client information handling system is provided from the plural formats of the multimedia container to the client information handling system.

20 Claims, 3 Drawing Sheets

MULTI-STREAM CONTAINER INFORMATION COMMUNICATION BETWEEN INFORMATION HANDLING SYSTEMS

BACKGROUND OF THE INVENTION

Field of the Invention

The present invention relates in general to the field of information handling system communications, and more particularly to multi-stream container information communication between information handling systems.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

One difficulty with practical use of information handling systems by an end user is the communication of multimedia information from an information handling system server to an information handling system client of the end user in a format that is presentable to the end user. Industry has developed various standards that aid in streaming and file copy support across different types of information handling systems, such as televisions, game consoles, smartphones and tablets. For example, Universal Plug N Play (UPNP) and Digital Living Network Alliance (DLNA) offer compatibility between different types of information handling systems for communicating multimedia information, such as audiovisual movies, pictures and music in various formats. Although multimedia information is communicated in compatible formats, a difficulty remains in that different types of information handling systems have different types of capabilities for presentation of information, such as different display resolutions, bitrates and codecs for presenting the information. For example, an SD resolution presents of visual information as images at a smartphone versus an HD resolution for presentation in high definition at a television.

In order to provide information to an information handling system client that matches the client's capabilities, a server will often either transcode information from a stored format to a format supported by the client or will store separate versions of the information for each type of supported client. Transcoding is expensive from a processing standpoint, tends to produce lower quality presentations and is often difficult to setup and unstable to execute. Storing multiple versions of the same information creates difficulties in the cataloging, searching and finding of a correct version for each type of client. One solution to address storage of multimedia content in multiple formats is the use of a "container" that stores multiple audio, video and subtitle streams so that a complete copy of multimedia content in multiple formats is kept in a single file. One example of a container is that offered by Matroska, an open standards project. The Matroska container does not define a video or audio compression format, but rather defines an envelope that stores multiple formats in a flexible and cross-platform container in combination with an open codec API. However, streaming of content from multi-stream containers is rarely supported by clients due to the waste of bandwidth involved in the communication of streams not supported by the client. One alternative is Scalable Video Coding (SVC), which provides a subset bitstream having a lower quality presentation. However, SVC requires new codecs and is not backwards compatible with existing codecs.

SUMMARY OF THE INVENTION

Therefore a need has arisen for a system and method which supports streaming of multimedia content from a multi-stream container to an information handling system in a format supported by the information handling system.

In accordance with the present invention, a system and method are provided which substantially reduce the disadvantages and problems associated with previous methods and systems for streaming information to a client in a format presentable by the client. Content is stored in a multimedia container in plural formats and made available for download to client information handling systems from a server information handling system through a network. The content is transmuxed from the multimedia container in one of the plural formats supported by the client information handling system to a delivery container for communication through the network, such as streaming to the client information handling system for presentation at a display and speaker.

More specifically, a server information handling system includes processing resources to execute a transmuxing module for providing content from a multimedia container to a client information handling system. The transmuxing module retrieves format information from the client to select one of plural formats stored in a multimedia container and supported by the client, such as codecs, bitrates and display resolution supported by the client. The selected format, such as a standard definition video and stereo audio movie format, is transmuxed from the multimedia container to a delivery container for streaming or file copy to the client. Using a single file in the form of a multimedia container to store plural formats provides reduced complexity in organizing and retrieving content, while transmuxing selects a supported format so that only one format is communicated over the network. If no format in a multimedia supports presentation at a client, then transcoding of a best-matching format to a supported format is provided.

The present invention provides a number of important technical advantages. One example of an important technical advantage is that multiple profile video and audio streams stored in a single container support presentation at a variety of client devices without transrating or transcoding. For example, a single container supports presentation of content on HTPC or home cinema devices with HD video and 5.1 audio streams, and presentation or copying to mobile devices with PD or SD video and 2.0 audio streams. A handshake between a server that stores the container and the client device establishes the format of information needed by the client device to allow transmuxing of information from the multi-stream container to the client device in only a supported format so that bandwidth consumption is reduced. Synchronization and copying of multimedia content is supported in a more rapid manner without transcoding and without effecting digital rights management keys.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

A server information handling system responds to requests for content by transmuxing multimedia content in one of plural formats from a multimedia container having the content in plural formats. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
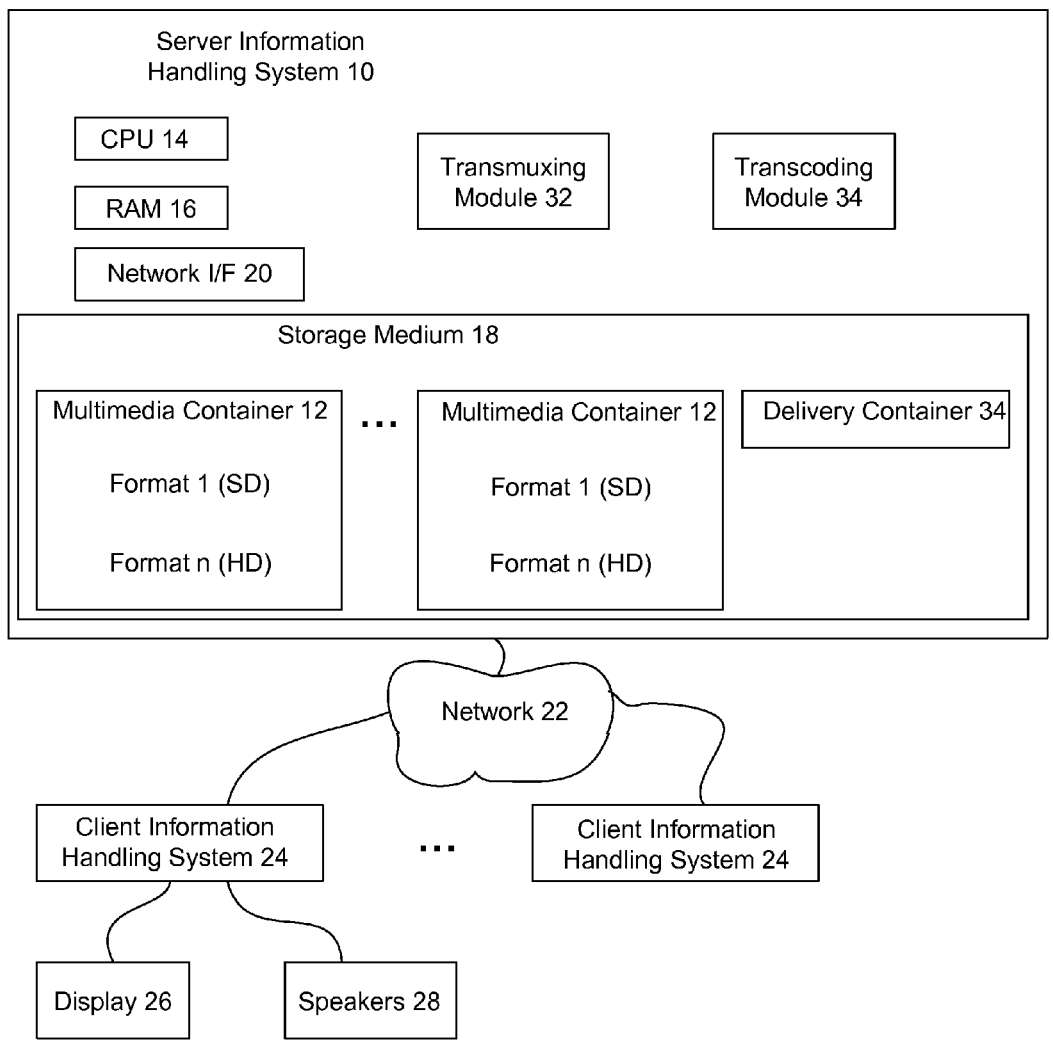
FIG. 1 depicts a block diagram of a server information handling system that transmuxes content in one of plural formats of a multimedia container.

Referring now to FIG. 1, a block diagram depicts a server information handling system 10 that transmuxes content in one of plural formats of a multimedia container 12. Server information handling system 10 is built from plural processing components that cooperate to process information, such as a CPU 14 that executes instructions of an application and RAM 16 that stores the instructions in support of operations by CPU 14. A storage medium 18 provides persistent storage for applications executed by CPU 14 and for content made available for communication through a network interface 20 and network 22. Client information handling systems 24 interface with server information handling system 10 through network 22 to retrieve content from storage medium 18 for presentation at a display 26 and speakers 28. For example, a client information handling system 24 requests streaming of a movie stored in a multimedia container and a streaming module 30 executing on server information handling system 10 streams the movie for presentation at a display 26 and speaker 28 of the client 24 as the movie downloads from the server 10. In alternative embodiments, streaming module 30 copies the movie or other content to memory of client information handling system 24 to allow client 24 to playback the content at a subsequent time.

Each of plural multimedia containers 12 stores a piece of multimedia content in one or more formats, such as a movie in a high definition (HD) format and the same movie in a standard definition (SD) format. One example of a container that stores multimedia content in plural formats as called for in the present disclosure is the MKV container defined by Matroska. Other examples of containers that may work with the present disclosure include containers that support both streaming and metadata or attachments, such as MP4, QT, and MOV containers. The multimedia container stores plural different versions of the same content in a single file so that multiple versions of the same content do not have to be stored in different files of storage medium 18. Multimedia container 12 supports multiple streams of the same content in the same file with a different format for each stream. For example, one container stores one set of the same piece of content in a single physical container file, such as an SD version of a movie for presentation at a smartphone client and an HD version of the same content for presentation at a television. By storing multiple versions of the same content in a single file, the container reduces the complexity of storing, cataloging, searching and finding a desired version of a particular piece of content since each version is stored in the same file.

When server information handling system 10 receives a request for multimedia content from a client information handling system 24, the content is located by locating the multimedia container 12 that stores the content. The content container allows location of the content without regard to the format needed by the client information handling system 24 for presentation of the content. A transmux module 32 analyzes the request for content and the formats available in the selected multimedia container 12 to determine a format to send in response to the request. For example, transmux module 32 and client 24 perform a handshake mechanism to provide transmux module 32 with format information of the client 24, such as containers, codecs, bitrates and resolutions supported by the client 24. Transmux module 32 analyzes the format information to select a format of the multimedia container 12 that best matches the client and then transmuxes the content in only that format to a delivery container 34 for communication to the client in response to the request. If the format selected from multimedia container 12 does not match a format supported by client information handling system 24, then a transcoding module 36 transcodes the content to a supported format and places the content in the supported format into delivery container 34. In one embodiment, the transcoded information is also stored in multimedia container 12 for use by subsequent requests of the content in the transcoded format.

Transmuxing module 32 attempts to respond to requests for content from a client information handling system by matching the format information provided by the client information handling system with a format available from multimedia container 12. If a direct match is found between a format available in multimedia container 12 and format information of a client information handling system 24, then transmuxing module 32 transmuxes the stream of the content in the matching format from multimedia container 12 to delivery container 34 for transmission to the client. Delivery container 34 has a new header file indicating the format and other transmission information, the existing digital rights management information from multimedia container 12 and only the selected best match streams for audio and video that are supported for presentation at display 26 and speakers 28 of client information handling system 24. Alternatively, transmuxing module 32 supports file copy and download to client information handling system 24. Conventional logic for performing transmuxing from one container to a container of a different format is applied except that transmuxing module 32 transmuxes a supported stream of a multimedia container having plural formats to delivery container 34 which supports one format so that unsupported streams or undesired streams are not sent to client information handling system 24. Transmuxing requires low overhead by CPU 14 because it involves simply copying content into a new container format without expensive transcoding or modification of the content stream. This provides client information handling system 24 with a high quality viewing experience with low latency and low resource overhead.

Figure 2:
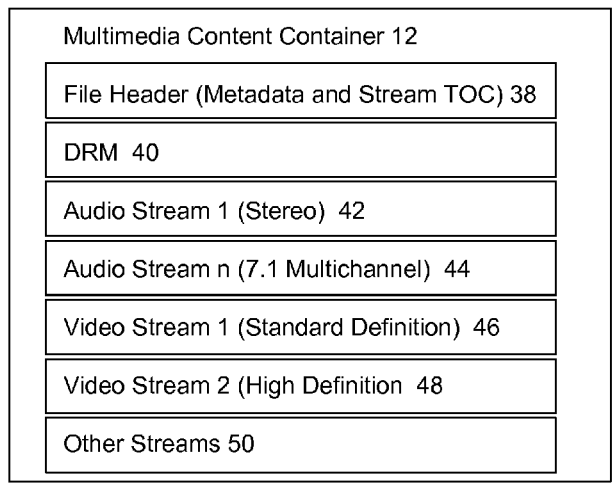
FIG. 2 depicts an example of a multimedia container having a content in plural formats.

Referring now to FIG. 2, an example is depicted of a multimedia container 12 having a content in plural formats. A file header 38 includes metadata and stream table of contents to support streaming of content to a client device. Digital rights management information 40 provides keys and security for streaming protected content when needed. Content is provided in plural formats, such as stereo audio 42, 7.1 multichannel audio 44, standard definition video 46, high definition video 48 and other streams 50. Delivery container 34 may have a similar structure, however, delivery container 34 includes the content in only one format, such as stereo audio 42 plus standard definition video 46. Conceptually, transmux module 32 streams a copy of the content in the selected format from multimedia container 12 to a delivery container 34 and sets file header 38 to reflect the content format so that a client information handling system 24 retrieves a requested stream as if the stream were stored in a container having a format consistent with the capability of the client for presenting visual and audio information.

Figure 3:
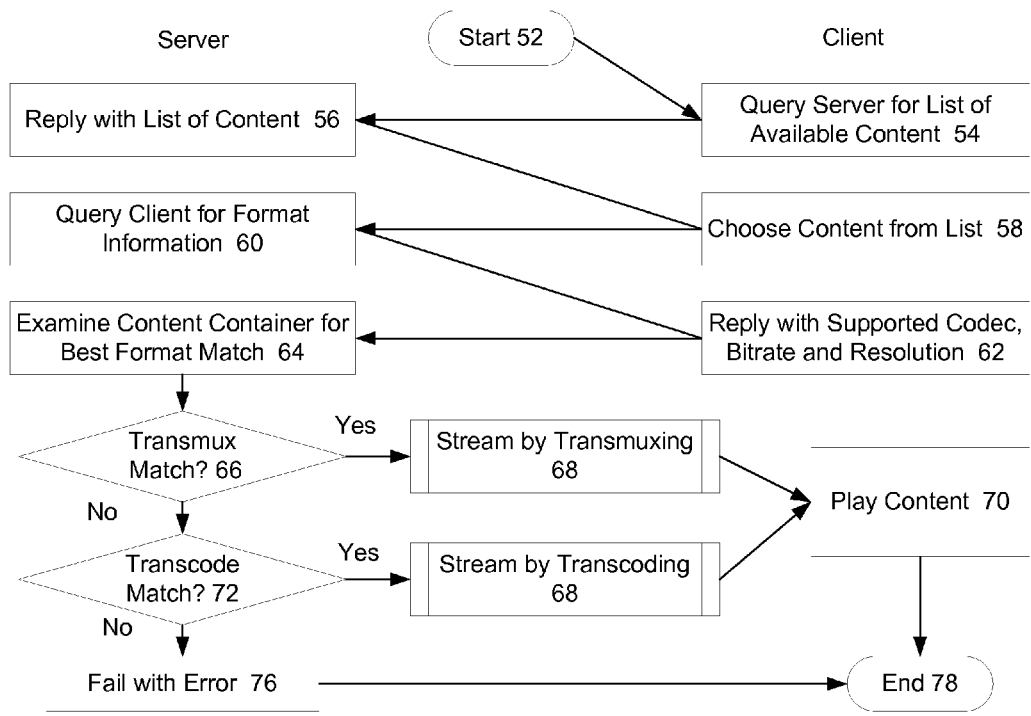
FIG. 3 depicts a flow diagram of a process for selecting a multimedia format to transmux from a multimedia container in response to a request for content.

Referring now to FIG. 3, a flow diagram depicts a process for selecting a multimedia format to transmux from a multimedia container in response to a request for content. The process starts at step 52 with a generation at a client information handling system 24 of a request for content. At step 54, client 24 queries server information handling system 10 for a list of available content. At step 56, server 10 replies to the query with a list of available content. At step 58, client 24 selects content from the list. At step 60, server 10 responds to the client selection by querying client 24 for format information, such as codecs, bitrates and resolutions supported by client 24. At step 62, client 24 responds to the query for format information by providing supported codecs, bitrates and resolutions. At step 64, server 10 analyzes the format information from client 24 and the formats available for the requested content to determine a format that best matches client 24.

Determining a format that best fits a client request for data proceeds to step 66 to determine if a match exists between a format supported by client 24 and the formats of the content within a multimedia container. If yes at step 66, the process continues to step 68 to transmux the content from the multimedia container to the client in the determined format, such as a movie with a video resolution and audio output. The process then continues to step 70 by presenting the content at client 24 with the stream. If at step 66 no match is found between a format supported by client 24 and a format available in the multimedia container, then the process continues to step 72 to generate a format match by transcoding from a selected format of the multimedia container to a format supported by client 24. The transcoded content in the transcoded format is streamed at step 74 to present the content at step 70. If at step 72 the transcoding is not available, the process continues to step 76 to fail with an error and to step 78 to end.

Figure 4:
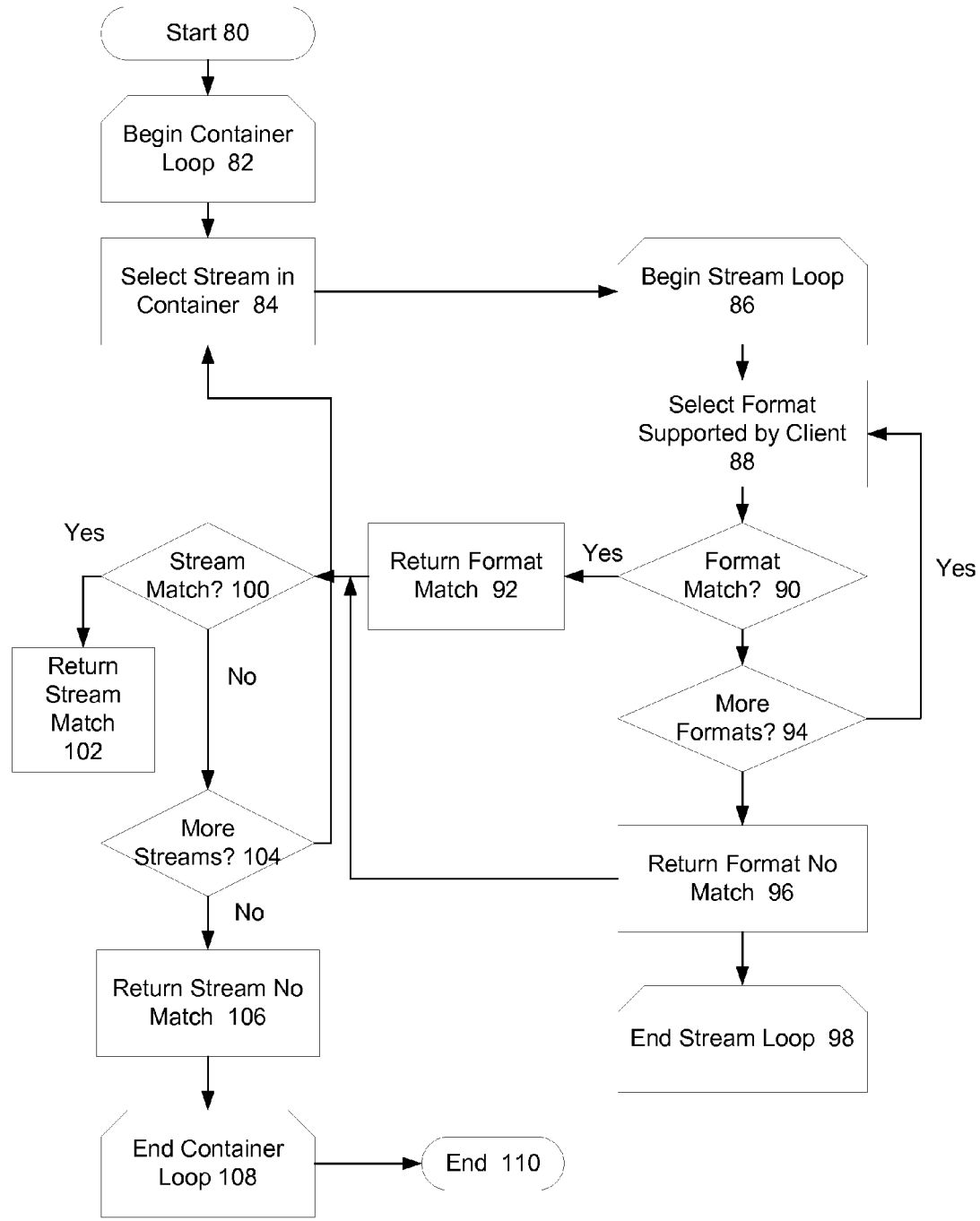
FIG. 4 depicts a flow diagram of a process for comparing format information associated with a request for content with available formats of a multimedia container.

Referring now to FIG. 4, a flow diagram depicts a process for comparing format information associated with a request for content with available formats of a multimedia container. The process starts at step 80 and continues to step 82 to begin a logical loop for selecting a content format and stream. At step 84, a stream of content is selected, such as from an ordered list, and the process continues to step 86 to begin a logical loop for selection of a format of the stream. At step 88, a format supported by the client is selected from available formats for the stream. At step 90, a determination is made of whether the format is an exact match with a format of the multimedia container. If not an exact match, the process continues to step 94 to determine if additional formats are available. If no additional formats are available, the process continues to step 96 to return the format as no match and the stream loop ends at step 98. If at step 94 additional formats are available, the process returns to step 88 to attempt to find a match of the formats in the multimedia container with the format supported by the client.

At step 90 if a match is found, the process continues to step 92 to return the format as a match, and continues to step 100 to determine if an exact match exists for a stream of the content in the matched format. If a match exists for the stream, the process continues to step 102 to return an exact match for the stream. If at step 100 an exact match is not found for the stream, the process continues to step 104 to determine if additional streams are available. If additional streams are available, the process returns to step 84 to select another stream and compare for a format match. If at step 104 no additional streams are left, the process continues to step 106 to return a stream as a no match. At step 108, the container loop ends and at step 110, the process ends.

Although the present invention has been described in detail, it should be understood that various changes, substitutions and alterations can be made hereto without departing from the spirit and scope of the invention as defined by the appended claims.

What is claimed is:

1. A method for presenting multimedia information at a client information handling system, the method comprising:
   sending a request from the client information handling system through a network to a server information handling system, the request for multimedia content, the multimedia content stored in a multimedia container having the multimedia content in plural formats;
   determining at the server information handling system a format for presentation of the multimedia content at the client information handling system;
   in response to the determining, copying the multimedia content from the multimedia container to a delivery container, the delivery container having the multimedia content in only the determined format; and
   sending the multimedia content in only the determined format from the server information handling system to the client information handling system through the network.

2. The method of claim 1 wherein the multimedia container includes digital rights management information for the multimedia content and copying the multimedia content further comprises copying the digital rights management information from the multimedia container to the delivery container.

3. The method of claim 1 wherein sending the multimedia content further comprises streaming the multimedia content in a standard definition format.

4. The method of claim 1 wherein sending the multimedia content further comprises streaming the multimedia content in a high definition format.

5. The method of claim 1 wherein determining at the server information handling system further comprises:
retrieving format information from the client information handling system to the server information handling system; and
analyzing the format information to match one of the plural formats to the format information.

6. The method of claim 5 wherein analyzing further comprises:
comparing the format information to the plural formats to determine a match does not exist;
selecting one of the plural formats for transcoding; and
transcoding the selected one of plural formats into the delivery container in a transcoded format.

7. The method of claim 6 further comprising storing the transcoded format in the multimedia container is association with the format information.

8. The method of claim 1 wherein the multimedia container comprises a Matroska container.

9. The method of claim 1 wherein sending the multimedia content further comprises copying the multimedia content to the client information handling system.

10. A system for presenting multimedia information, the system comprising:
a server information handling system interfaced with a network and operable to execute instructions;
a storage medium interfaced with the server information handling system;
a multimedia container stored in the storage medium and having multimedia content in plural formats;
a transmuxing module having instructions operable to execute on the server information handling system to respond to a request for the content received through the network by determining a format based upon one or more predetermined conditions and transmuxing the content in only the determined format from the multimedia container to a delivery container for communication through the network.

11. The system of claim 10 further comprising:
digital rights management information associated with the content and stored in the multimedia container;
wherein the transmuxing module is further operable to copy the digital rights management information from the multimedia container to the delivery container with the content.

12. The system of claim 10 further comprising a streaming module having instructions operable to execute on the server information handling system to stream the content from the delivery container through the network in response to the request.

13. The system of claim 12 wherein the plural formats comprise a standard definition format and a high definition format.

14. The system of claim 10 wherein the transmuxing module is further operable to respond to the request for content by retrieving format information in response to the request for content and applying the format information to determine the predetermined conditions.

15. The system of claim 14 wherein the format information comprises a codec of a client information handling system associated with the request for the content.

16. The system of claim 14 wherein the format information comprises a bitrate of a client information handling system associated with the request for content.

17. The system of claim 14 wherein the format information comprises a display resolution of a client information handling system associated with the request for content.

18. A system for presenting multimedia content, the system comprising:
non-transitory memory storing instructions configured for:
plural multimedia containers, each multimedia container having a unique multimedia content in plural formats; and
a transmuxing module operable to respond to a request for the multimedia content received through a network by determining a format based upon format information associated with the request and transmuxing the multimedia content in only the determined format from a multimedia container to a delivery container for communication in response to the request.

19. The system of claim 18 further comprising a transcoding module interfaced with the transmuxing module and operable to transcode the multimedia content from a selected one of the plural formats to a format not included in a selected of the multimedia containers.

20. The system of claim 18 wherein the multimedia container comprises a Matroska container.

* * * * *